United States Patent
Choi et al.

(10) Patent No.: US 11,818,003 B2
(45) Date of Patent: *Nov. 14, 2023

(54) ELECTRONIC DEVICE FOR SUPPORTING ACCESS TO WIRELESS MEDIA USING TARGET WAKE TIME (TWT) DEFINED IN IEEE 802.11 STANDARD

(71) Applicant: SAMSUNG ELECTRONICS CO., LTD., Suwon-si (KR)

(72) Inventors: Junsu Choi, Suwon-si (KR); Hyunkee Min, Suwon-si (KR); Hyunah Oh, Suwon-si (KR); Sunkee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

This patent is subject to a terminal disclaimer.

(21) Appl. No.: 17/531,451

(22) Filed: Nov. 19, 2021

(65) Prior Publication Data

US 2022/0078079 A1  Mar. 10, 2022

Related U.S. Application Data

(63) Continuation of application No. 16/550,705, filed on Aug. 26, 2019, now Pat. No. 11,206,184.

(30) Foreign Application Priority Data

Sep. 6, 2018 (KR) .................. 10-2018-0106607

(51) Int. Cl.
*H04L 41/0816* (2022.01)
*H04W 72/0446* (2023.01)
(Continued)

(52) U.S. Cl.
CPC .......... *H04L 41/0816* (2013.01); *H04L 41/50* (2013.01); *H04W 4/80* (2018.02);
(Continued)

(58) Field of Classification Search
CPC ...... H04L 41/0816; H04L 41/50; H04W 4/80; H04W 12/08; H04W 72/0446;
(Continued)

(56) References Cited

U.S. PATENT DOCUMENTS 8,891,467 B2  11/2014  Awoniyi et al.
9,462,550 B2  10/2016  Jafarian et al.
(Continued)

FOREIGN PATENT DOCUMENTS

KR  10-2016-0050448 A  5/2016
KR  10-2016-0097511 A  8/2016
(Continued)

OTHER PUBLICATIONS

Fisher; "CR TWT Operation"; P802.11 Wireless LANs; IEEE 802.11-17/1138r12; p. 20, 23-27; Sep. 2017.
(Continued)

*Primary Examiner* — Mang Hang Yeung
(74) *Attorney, Agent, or Firm* — BROADVIEW IP LAW, PC

(57) ABSTRACT

An electronic device is provided, which includes a housing, at least one wireless communication circuit located inside the housing and configured to transmit and receive a wireless signal in accordance with the IEEE 802.11 standard, a processor operatively connected to the wireless communication circuit, and a memory operatively connected to the processor and configured to store target wake time (TWT) configuration information based on a quality of service (QoS) individually related to at least one service type, wherein the memory, when executed, stores instructions to
(Continued)

cause the processor to broadcast a signal including the TWT configuration information using the wireless communication circuit, receive, from an external electronic device, an authority request for a first TWT at least partly based on the broadcasted information, transmit an authority approval for the first TWT to the external electronic device based on the TWT configuration information and the authority request, and transmit and receive data with the external electronic device at a time selected by the TWT configuration information based on the first TWT. Other certain embodiments are possible.

16 Claims, 10 Drawing Sheets

(51) Int. Cl.
      *H04W 4/80*       (2018.01)
      *H04L 41/50*       (2022.01)
      *H04W 12/08*       (2021.01)
      *H04W 72/30*       (2023.01)
      *H04W 72/542*       (2023.01)
      *H04W 68/00*       (2009.01)
      *H04W 84/12*       (2009.01)

(52) U.S. Cl.
    CPC ....... *H04W 12/08* (2013.01); *H04W 72/0446* (2013.01); *H04W 72/30* (2023.01); *H04W 72/542* (2023.01); *H04W 68/005* (2013.01); *H04W 84/12* (2013.01)

(58) Field of Classification Search
    CPC . H04W 72/30; H04W 72/542; H04W 68/005; H04W 84/12; H04W 48/10; H04W 52/0216; H04W 74/002; H04W 74/0808; H04W 74/08; H04W 88/02; Y02D 30/70
    USPC ........................................................ 370/254
    See application file for complete search history.

(56) References Cited

U.S. PATENT DOCUMENTS

| | | | |
|---|---|---|---|
| 2015/0327262 A1* | 11/2015 | Kwon | ................... H04W 72/23 370/329 |
| 2016/0126996 A1 | 5/2016 | Jeong et al. | |
| 2016/0219522 A1* | 7/2016 | Asterjadhi | ........ H04W 52/0216 |
| 2016/0232365 A1 | 8/2016 | Oh et al. | |
| 2017/0078160 A1 | 3/2017 | Hong et al. | |
| 2018/0084496 A1 | 3/2018 | Lee et al. | |
| 2018/0115950 A1 | 4/2018 | Asterjadhi et al. | |
| 2018/0132175 A1 | 5/2018 | Choi et al. | |
| 2018/0132178 A1 | 5/2018 | Park et al. | |
| 2018/0192444 A1 | 7/2018 | Park et al. | |
| 2019/0072661 A1 | 3/2019 | Jeon et al. | |
| 2019/0253972 A1 | 8/2019 | Park et al. | |

FOREIGN PATENT DOCUMENTS

| | | |
|---|---|---|
| KR | 10-2017-0033121 A | 3/2017 |
| KR | 10-2458532 B1 | 10/2022 |
| WO | 2018/056680 A1 | 3/2018 |

OTHER PUBLICATIONS

Fisher; CR TWT IE; P802.11 Wireless LANs; IEEE 802.11-17/1893r6; p. 12-22; Jan. 2018.
International Search Report dated Dec. 9, 2019.
European Search Report dated Oct. 11, 2021.
Decision of Patent for KR10-2018-0106607 by Korean Intellectual Property Office dated Jan. 13, 2023.

* cited by examiner

ELECTRONIC DEVICE FOR SUPPORTING ACCESS TO WIRELESS MEDIA USING TARGET WAKE TIME (TWT) DEFINED IN IEEE 802.11 STANDARD

CROSS-REFERENCE TO RELATED APPLICATION(S)

This application is a continuation of U.S. patent application Ser. No. 16/550,705, filed on Aug. 26, 2019, which claims priority from Korean Patent Application No. 10-2018-0106607, filed on Sep. 6, 2018, in the Korean Intellectual Property Office, the disclosure of which is incorporated by reference herein in its entirety.

BACKGROUND

Field

The disclosure relates to an electronic device that provides support to enable stations to access wireless media at different times in a wireless local area network (wireless LAN) in accordance with the IEEE 802.11 standard.

Description of the Related Art

Wireless channels have a limited amount of bandwidth and can have numerous devices attempting to access the wireless channels. It is important that the higher priority access categories be able to access the wireless channels.

The above information is presented as background information only to assist with an understanding of the disclosure. No determination has been made, and no assertion is made, as to whether any of the above might be applicable as prior art with regard to the disclosure.

SUMMARY

Certain embodiments of the disclosure can provide an electronic device comprising: a housing; at least one wireless communication circuit located inside the housing and configured to transmit and receive a wireless signal in accordance with a short range wireless communication protocol; at least one processor operatively connected to the wireless communication circuit; and a memory operatively connected to the processor storing target wake time (TWT) configuration information based on a quality of service (QoS) individually related to at least one service type, wherein the memory stores instructions, and wherein when said at least one processor executes the instructions, causing the at least one processor to: broadcast a signal including the TWT configuration information using the wireless communication circuit, receive, from an external electronic device, an authority request for a first TWT based at least in part on the broadcasted information, transmit an authority approval for the first TWT to the external electronic device based on the TWT configuration information and the authority request, and transmit and receive data with the external electronic device at a time selected by the TWT configuration information based on the first TWT.

According to certain embodiments, an electronic device comprising a housing; a display configured to be shown through a part of the housing; at least one wireless communication circuit located inside the housing and configured to transmit and receive a wireless signal in accordance with a short range wireless protocol; at least one processor operatively connected to the display and the wireless communication circuit; and a memory operatively connected to the processor, wherein the memory, stores instructions, when executed by the at least one processor cause the at least one processor to: receive a signal including target wake time (TWT) configuration information from an external electronic device through the wireless communication circuit, transmit an authority request for a first TWT based on a first service type supported by the electronic device, receive an authority approval for the first TWT from the external electronic device, and transmit and receive data with the external electronic device at a time selected by the TWT configuration information based on the first TWT.

According to the certain embodiments of the disclosure, a method for operating an electronic device, comprises broadcasting target wake time (TWT) configuration information based on a quality of service (QoS) individually related to at least one service type using at least one wireless communication circuit configured to transmit and receive a wireless signal in accordance with short range wireless protocol; receiving, from an external electronic device, an authority request for a first TWT based at least in part on the broadcasted information; transmitting an authority approval for the first TWT to the external electronic device based on the TWT configuration information and the authority request; and transmitting and receiving data with the external electronic device at a time selected by the TWT configuration information based on the first TWT.

DETAILED DESCRIPTION

In a wireless LAN, stations may perform back-off operations for accessing wireless media for each access category (AC) defined in the IEEE 802.11e standard. As the AC has a higher priority, it may have an advantageous configuration in occupying the wireless media for a contention window (CW) and an inter-frame space (IFS). Accordingly, as the priority of the AC becomes higher, the probability that the AC can occupy the wireless media provided by an access point (AP) and it can transmit traffics becomes higher, and through this, connectivity services having different qualities may be provided to the stations in accordance with user's service requirements.

In the 802.11e standard as described above, quality of service (QoS) discrimination has been introduced to define an AC and to provide, to stations, connectivity services having different qualities in accordance with service requirements. However, if stations connected to an AP simultaneously perform wireless media access attempts (e.g., back-off operations) with respect to all ACs, the probability of occupying the wireless media with respect to the AC (e.g., voice (VO)) having a high priority may become higher, but the QoS of a predetermined level may not be guaranteed with respect to each AC. For example, if a first traffic occupies the wireless media and it is transmitted and received through the wireless media even in a state where a second traffic is higher than the first traffic in ranking, it is difficult for the second traffic to access the wireless media having already been occupied, and thus the quality of the corresponding service may not be guaranteed.

Electronic Device

Figure 1:
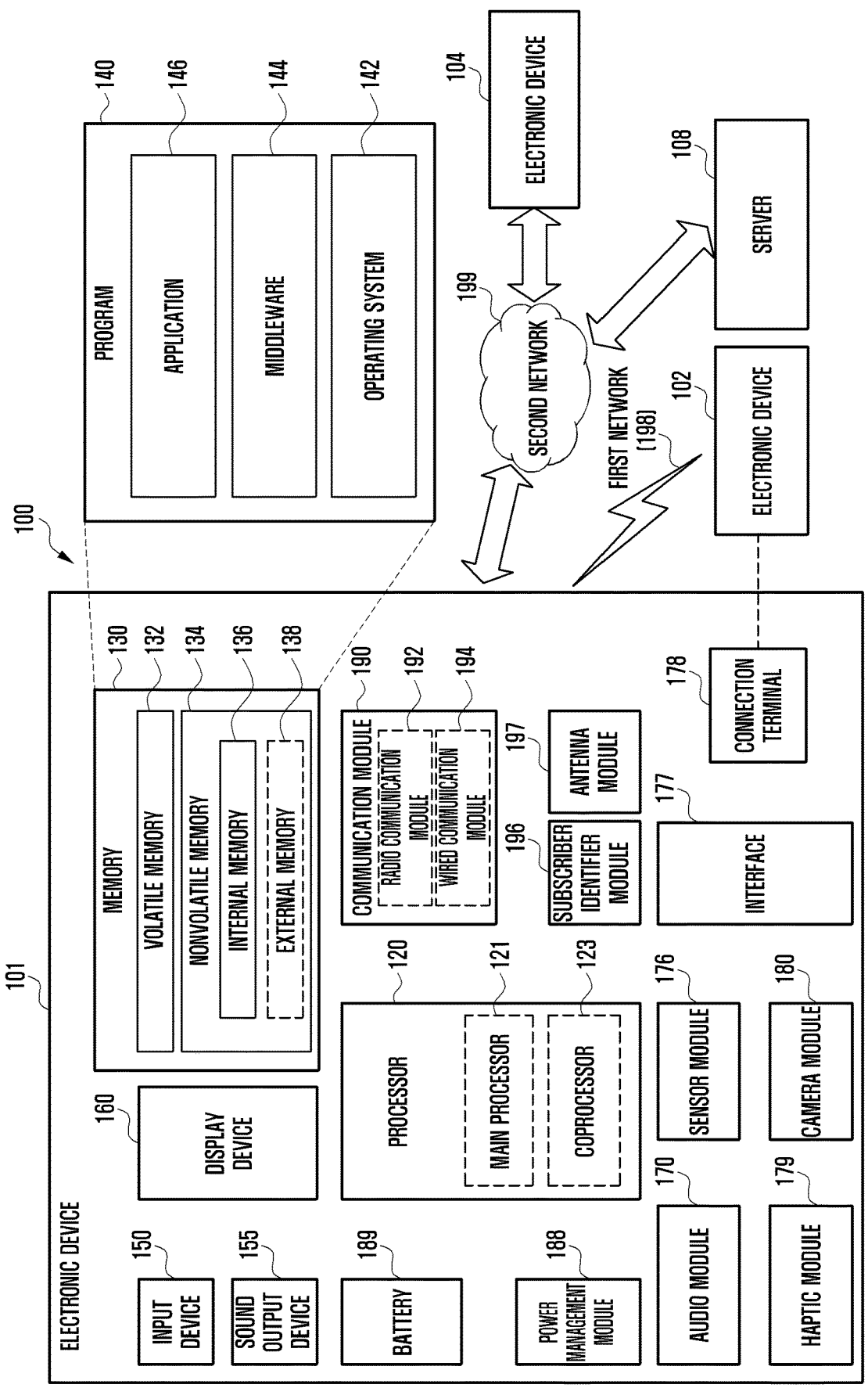
FIG. 1 is a diagram illustrating an electronic device in a network environment according to certain embodiments.
Figure 2:
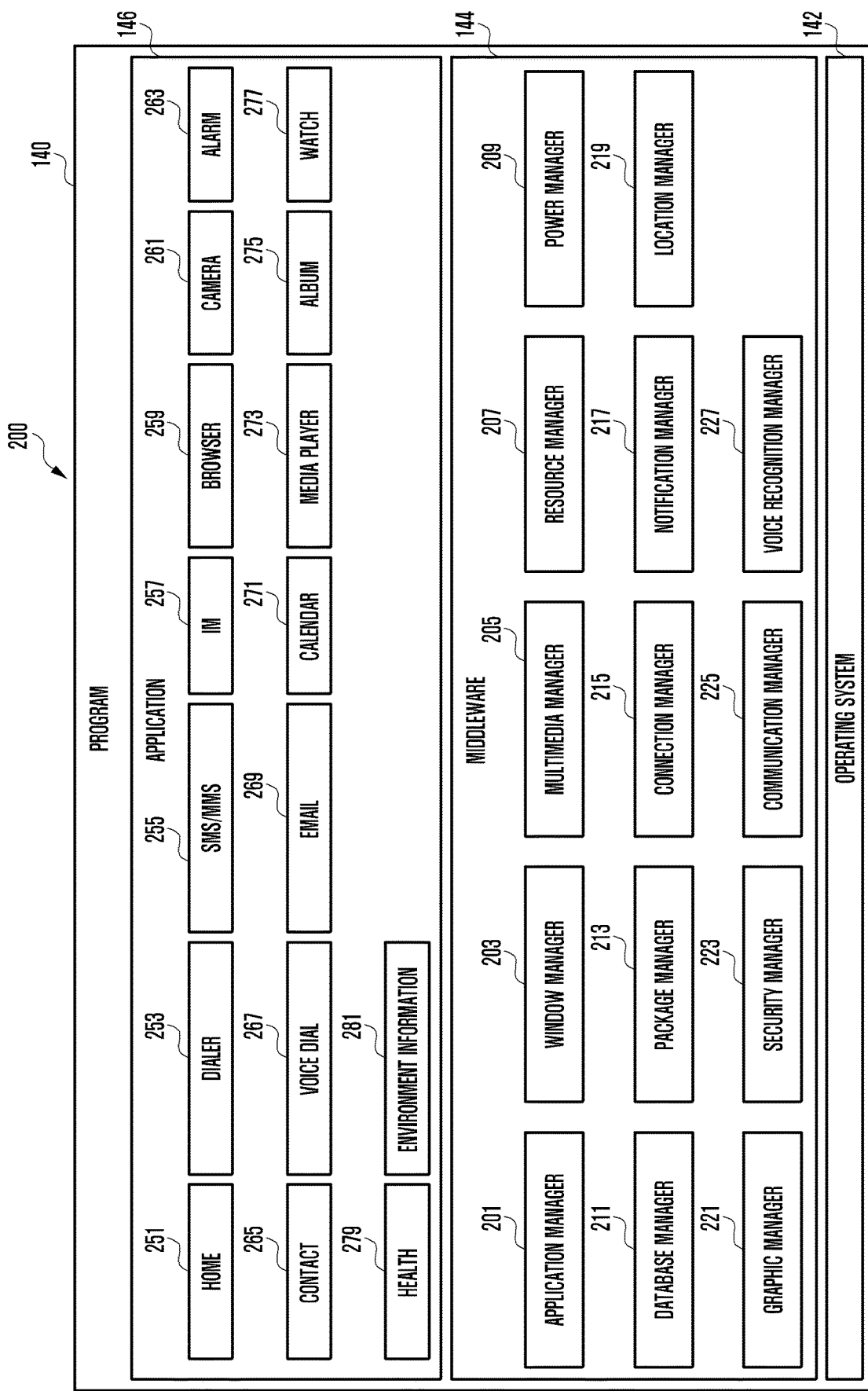
FIG. 2 is a block diagram exemplifying a program according to certain embodiments.

FIGS. 1 and 2 will describe an electronic device.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™' At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Wireless LAN

The access point 330 can use the Target Wake Time (TWT) to allocate wireless media. The access point 330 can use repeating frames of a predetermined length. The frames (which will be described in FIG. 5) can be divided according to the TWT configuration. The intervals of the frame can be dynamically changed according to requests by the stations 310.

The access point 330 can establish different TWT IDs corresponding to different service types and, such as video (VI), Best Effect (BE), Background (BK), and Voice (VO), and a default based on requests from the stations 310, and can be associated different intervals of the frame. The access point can also vary the time of the intervals.

The access point 330 manages the TWT IDs by controlling authority to different stations responsive to requests. For example, when a station request authority for a service for which a TWT that has not been established, the access point 330 can generate the TWT ID for the service. If a station requests authority for a service for which too many other stations already have authority, the access point can either extend the interval and shorten other intervals, give authority with a TWT ID associated with a default, or create another TWT ID for the service, or deny the request.

In the foregoing manner, the access point 330 avoids resource contention between multiple stations 310 attempting to access the channel at the same time.

Figure 3:
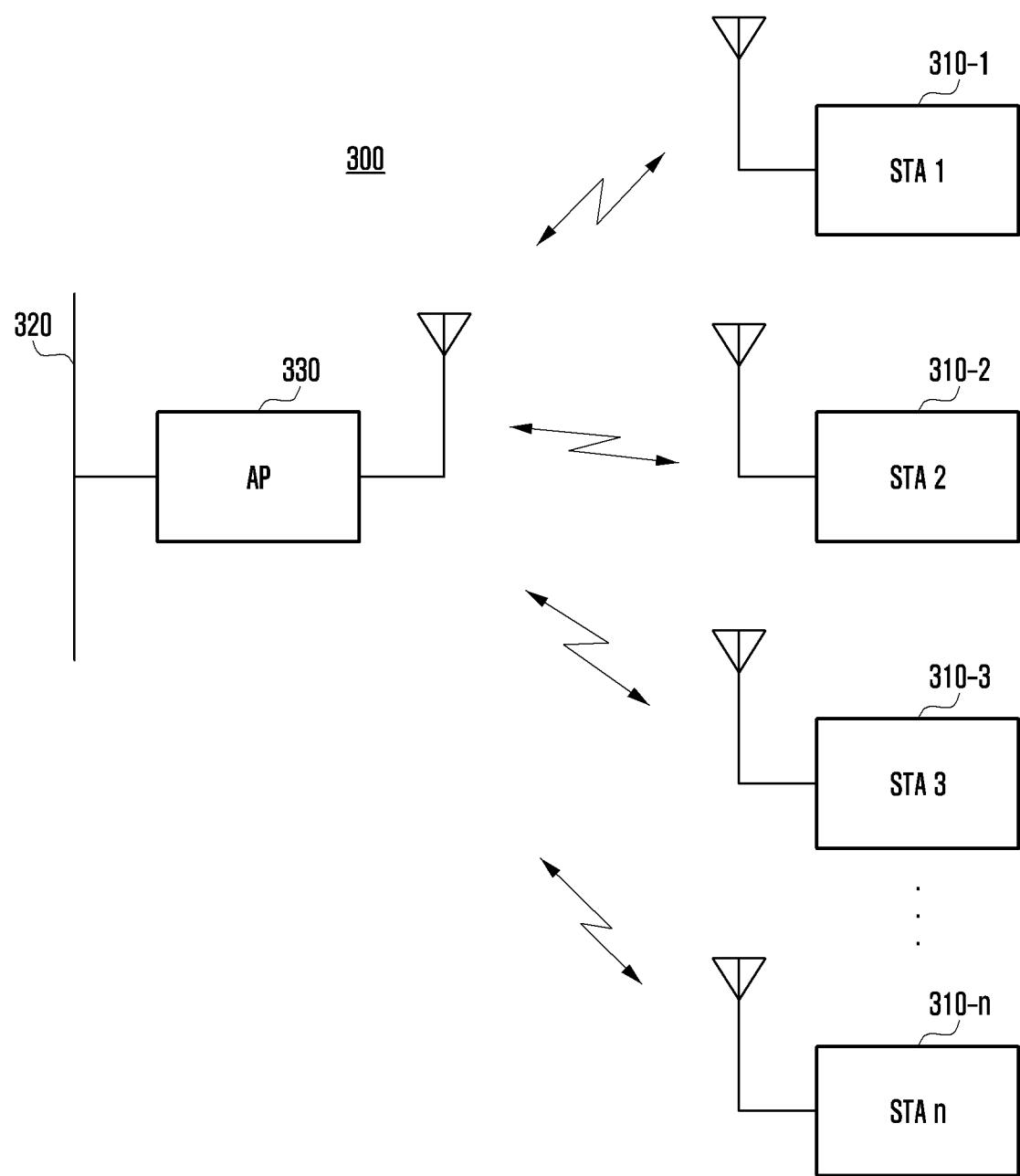
FIG. 3 is a diagram illustrating a wireless local area network (wireless LAN) according to certain embodiments of the disclosure.

FIG. 3 is a diagram illustrating a wireless local area network (wireless LAN) 300 according to certain embodiments of the disclosure. Referring to FIG. 3, a wireless LAN 300 may include a plurality of stations (STA) 310_1, 310_2, 310_3, . . . , and/or 310_n and an access point (AP) 330 (e.g., electronic device 102 of FIG. 1), according to an embodiment. At least one of the plurality of stations 310_1, 310_2, 310_3, . . . , and/or 310_n may have substantially the same configuration as that of at least one of configurations of an electronic device 101 of FIG. 1.

The AP 330 may support connections between the plurality of stations 310_1, 310_2, 310_3, . . . , and/or 310_n and an external network (e.g., cellular network, Internet, or external LAN) 320. For example, The AP 330 may support an operation in which the plurality of stations 310_1, 310_2, 310_3, . . . , and/or 310_n transmit data to the external network 320 and/or an operation in which the plurality of stations 310_1, 310_2, 310_3, . . . , and/or 310_n receive data from the external network 320). Generally, the AP receives the data from stations 310_1, 310_2, . . . 310_n and provides to network 320. The AP receives data for stations 310_1, 310_2, . . . 310_n and transmits the data from the network 320 to the appropriate station.

According to certain embodiments, the AP 330 may provide connectivity services with the external network 320 to the stations 310_1, 310_2, 310_3, . . . , and/or 310_n on the basis of a target wake time (TWT) of the stations 310. The target wake time (TWT) in turn can be based on a quality of service (QoS) individually related to at least one service type that can be supported by the AP 330. Services that can be supported by the AP 330 may be differentiated based on an access category (AC) defined in the IEEE 802.11e standard. For example, the AP 330 may classify traffics into any one of a voice (VO), a video (VI), a best effort (BE), and a background (BK) in accordance with their priorities.

The TWT is defined in the 802.11ax standard, and according to certain embodiments of the disclosure, may be used for the purpose of dynamically allocating wireless media (wireless communication channels) to the stations 310_1, 310_2, 310_3, . . . , and/or 310_n (e.g., differently allocating times accessible to the wireless media for service types of the traffics) based on the service types required by the stations 310_1, 310_2, 310_3, . . . , and/or 310_n. In certain embodiments, the TWT can be set to cause a particular stations 310 to have a higher priority. For example, the AP 330 may configure the TWTs for service types (e.g., VO, VI, BE, and/or BK). The AP 330 may enable the stations 310_1, 310_2, 310_3, . . . , and/or 310_n to share (e.g., through broadcasting) the TWT configuration information (TWT settings) (e.g., information indicating a TWT ID, a service type allocated to the TWT, and a TWT service period or duration (e.g., period between a time when the TWT starts and a time when the TWT is ended) and/or a TWT interval (e.g., information indicating an interval between the start of the TWT and the repetition thereof next time)). The AP 330 may record the TWT configuration information in "vendor specific information element" of a management frame defined in the 802.11 standard, and it may transmit the TWT configuration information to the stations 310_1, 310_2, 310_3, . . . , and/or 310_n. The stations 310_1, 310_2, 310_3, . . . , and/or 310_n may identify, for example, a start time (wake time) and a service period and interval among the TWT configuration information with reference to, for example, the TWT ID in the TWT information element of a beacon frame defined in the 802.11ax standard.

If a user requires a service, the stations 310_1, 310_2, 310_3, . . . , and/or 310_n may identify the TWT allocated to the required service type based on the TWT configuration information (e.g., TWT configuration information as in Table 1 below) received from the AP 330, and by accessing the wireless media in the identified TWT service period, the stations may transmit data of the required service type to the external network 320 through the AP 330 and/or may receive, from the external network 320, the data of the required service type through the AP 330 during the identified TWT service period. As described above, in the wireless LAN 300, the traffics may be in a temporarily distributed deployment state in accordance with the service type (e.g., VO, VI, BE, and/or BK). Accordingly, traffic concentration in the same time zone (e.g., collision phenomenon), which is caused by the attempts of the stations 310_1, 310_2, 310_3, . . . , and/or 310_n to simultaneously occupy the wireless media for the same service, can be prevented from occurring.

According to a certain embodiment, as shown in Table 1, the AP 330 may configure a default TWT (in the table TWT 5) for being accessible to the wireless media regardless of the service type. Accordingly, the stations 310_1, 310_2, 310_3, . . . , and/or 310_n can access the wireless media in the service period of the default TWT regardless of the required service type.

TABLE 1

| Service Type | TWT ID | TWT Service Period | TWT Interval |
|---|---|---|---|
| VI | 1 | First service period | First interval |
| BE | 2 | Second service period | Second interval |
| BK | 3 | Third service period | Third interval |
| VI | 4 | Fourth service period | Fourth interval |
| Default | 5 | Fifth service period | Fifth interval |
| VO | | Not allocated | |

Table 1 corresponds to one example of the TWT configuration information, and various TWT configurations are possible through Table 1. For example, if plural stations request VI from the AP 330, TWT IDs 1 and 4 may be allocated to VI, and VO may not be included in the TWT configuration information because there is no station having requested VO from the AP 330.

According to certain embodiments, the AP 330 may configure a TWT interval based on an acceptable latency for each service. Certain services may allow for more latency than other services. For example, the latency may be defined by a period between a moment when a packet is sent from a source and a moment when the packet arrives at a destination. As another example, the latency may also be defined through addition of time required for the packet (e.g., acknowledgment (ACK) from the destination with respect to the packet sent from the source) to return from the destination to the source to the latency (round trip). A critical latency can be the latency in which deterioration of the quality of service occurs. With reference to the thesis related to VoIP call quality "Hyewon Lee, Seongho Byeon, Byoungjin Kim, Kwang Bok Lee, and Sunghyun Choi, "Enhancing Voice over WLAN via Rate Adaptation and Retry Scheduling," IEEE Transactions on Mobile Computing, vol. 13, issue 12, pp. 2791-2805, December 2014, which is incorporated herein by reference, "a case where a call quality score (R-score) in accordance with the latency (or mouth to ear delay) and the VoIP frame loss rate is about 80 points or more may be considered to correspond to an acceptable call quality, and the latency when the call quality score starts to be lowered to 80 points or less may be considered as a critical latency. As can be known from the above thesis, the acceptable latency may be equal to or lower than the critical latency (e.g., <80 points), and if the latency becomes equal to or higher than the critical latency (e.g., >80 points), the packet loss rate may be equal to or lower than that required for the corresponding service quality. The AP 330 may configure the TWT interval to be shorter than the given critical latency in consideration of the service quality.

According to certain embodiments, the AP 330 may configure the TWT service period based on a data transmission speed supported in the IEEE 802.11 standard. According to an embodiment, the stations 310_1, 310_2, 310_3, . . . , and/or 310_n and the AP 330 may have a plurality of queues for each of the different service types, and they may store data of a particular service in a queue for the service.

When the TWT starts, the stations 310_1, 310_2, 310_3, . . . , or 310_n and the AP 330 may transmit the data stored in the corresponding queues at a data transmission speed supported in the IEEE 802.11 standard (e.g., average data rate). When the TWT interval is configured as described above, the data may be accumulated in the corresponding queue at the TWT interval. The AP 330 may configure the TWT service period based on the data transmission speed so that the AP can send or receive the data accumulated in the queue at the TWT interval during the TWT service period. For example, the AP 330 may configure the TWT service period so that a data quantity as a multiple of the data transmission speed by the TWT interval is processed (transmitted) during one TWT service period. According to an embodiment, the AP 330 may configure the TWT service period so that the TWT service periods do not overlap each other for each TWT. For example, with reference to Table 1, the AP 330 may configure the TWT service periods so that a second service period starts after a first service period is ended, a third service period starts after the second service period is ended, and a fourth service period starts after the third service period is ended. In certain embodiments, the successive service periods may immediately following the preceding service periods, or following a nominal time period.

According to certain embodiments, the AP 330 may update the TWT configuration information based on a TWT usage rate, and it may enable the stations 310_1, 310_2, 310_3, . . . , and/or 310_n to share (e.g., through broadcasting) the updated TWT configuration information. According to an embodiment, the AP 330 may monitor a data throughput for each service type at a given interval, and it may adjust the TWT service period for each service type based on the data throughput. In certain embodiments, the AP 330 may adjust the TWT service period so that the throughput is sufficient for each service. For example, the data throughput may be considered the amount of data sent and received during a given time period between the AP 330 and the stations.

If the throughput is too low for a service, the TWT configuration for that service may be deleted, and the service periods of lower priority services may be lengthened. With reference to Table 1 as above, if the data throughput of TWT ID No. 1 is equal to or lower than a predetermined first critical value (e.g., if the corresponding service period is empty), the AP 330 may delete all TWT configuration of ID No. 1 from the TWT configuration information in Table 1. The AP 330 may lengthen the service period of another TWT (e.g., the fourth service period of ID No. 4 corresponding to the VI having the highest priority as defined in the 802.11e standard among the remaining TWTs) as long as the deleted first service period of the deleted ID No. 1.

If the through put is higher than necessary for a particular service, a new TWT ID for the service may be generated, and the service period of another TWT may be shortened. If the data throughput of TWT ID No. 1 is equal to or higher than a predetermined second critical value (that is higher than the first critical value) (e.g., this means that traffics of the corresponding service type are concentrated in the corresponding service period), the AP 330 may lengthen the first service period. As another example, if the data throughput of TWT ID No. 1 is equal to or higher than the second critical value, the AP 330 may generate a new TWT ID, and it may the same service type as that of ID No. 1 to a newly generated TWT ID. The AP 330 may shorten the service period of another TWT (e.g., the third service period of ID No. 3 corresponding to the BK having the lowest priority as defined in the 802.11e standard among the remaining TWTs) as long as the lengthened service period of TWT ID No. 1. As another example, the AP 330 may lengthen the interval of another TWT (e.g., an interval of ID 3) as long as the lengthened service period of TWT ID No. 1. As exemplified above, the AP 330 may transmit (e.g., broadcast) the updated TWT configuration information to the stations 310_1, 310_2, 310_3, . . . , and/or 310_n.

According to certain embodiments, the AP 330 may update the TWT configuration information in response to a station's request, and it may enable the stations 310_1, 310_2, 310_3, . . . , and/or 310_n to share (e.g., through broadcasting) the updated TWT configuration information.

According to an embodiment, a station may transmit a request for generating a TWT for a particular service, when the station is running an application, and the application requires a service that is not allocated in the TWT configuration information. A station (e.g., any one of the stations 310_1, 310_2, 310_3, . . . , and/or 310_n) may recognize that the service type of an application executed by the station in accordance with user's requirements, and it may recognize that VO is not allocated to the TWT configuration information (e.g., TWT configuration information of Table 1) received from the AP 330. Accordingly, the station may transmit a message for requesting generation of a TWT corresponding to VO to the AP 330. In response to the reception of the request message, the AP 330 may newly generate the TWT for a VO service and it may update the TWT configuration information. For example, the AP 330 may configure an ID (e.g., No. 6) of the TWT for the VO service, and a service period and interval, and it may add such a configuration to the TWT configuration information of Table 1. The AP 330 may reduce the service period of another TWT (e.g., a third service period of ID No, 3 corresponding to the BK having the lowest priority as defined in the 802.11e standard among the remaining TWTs, or a service period needing the lowest data throughput) equal in length to the service period of TWT ID No. 6. As above, the AP 330 may transmit the updated TWT configuration information to the stations 310_1, 310_2, 310_3, . . . , and/or 310_n.

According to an embodiment, if it is recognized that adjustment of a service period of the existing TWT is not possible (e.g., if the data throughput at the corresponding TWT is equal to or higher than a predetermined level to cause a busy state as a whole), the AP 330 may transmit (e.g., broadcast) a response message including information indicating that TWT generation is not possible (e.g., values indicating the station ID and TWT generation impossibility). Accordingly, the station having requested the TWT generation may access the wireless media at a usable TWT (e.g., TWT (default) of ID No. 5 in Table 1) period regardless of the required service type.

According to certain embodiments, the AP 330 may manage (e.g., give (or generate) and/or recover (or release) a TWT authority (membership) as an authority for the station to occupy the wireless media at the TWT.

According to an embodiment, a station (e.g., any one of the stations 310_1, 310_2, 310_3, . . . , and/or 310_n) may request the AP 330 to give a usage authority for a specific TWT. For example, the station may transmit, to the AP 330, an authority request message including a station ID (e.g., MAC address) and a corresponding TWT ID. The AP 330 may generate authority approval information (e.g., a station ID, a TWT ID, and/or a value indicating an authority approval) in response to reception of the authority request message to store the authority approval information in a memory of the AP 330. The AP 330 may then transmit (e.g., broadcast) a response message including the authority approval information. The station may identify the TWT on which the station is authorized in the response message, and may access the wireless media in the corresponding service period.

According to an embodiment, with reference to Table 1, if the station requests authority for a service type of the TWT is VI and its ID is No. 1, and there are too many other members authorized on the corresponding TWT (e.g., this means that the members participating in the corresponding TWT are in a saturated state), the AP 330 may transmit, to the corresponding station, an authority approval message, for example, for the TWT of ID No. 4, which has the same service type and a different service period, and which is not in a saturated state. Accordingly, the stations may access the wireless media at different times (TWTs). As a result, resource contention, which is caused by the stations' attempts to simultaneously occupy the wireless media, can be prevented from occurring (or can be minimized).

According to an embodiment, if the TWT of ID No. 4 is also in a saturated state, the AP 330 may newly generate a TWT for a VI service, and it may update the TWT configuration information. For example, the AP 330 may configure a TWT ID (e.g., No. 6) for the VI service, a service period and interval, and it may add such a configuration to the TWT configuration information of Table 1 and adjust the remaining TWT service periods. The AP 330 may reduce the service period of another TWT (e.g., a third service period of ID No, 3 corresponding to the BK having the lowest priority as defined in the 802.11e standard among the remaining TWTs, or a service period having the lowest data throughput) as long as the service period of TWT ID No. 6. As shown above, the AP 330 may store the updated TWT configuration information and the authority approval information (e.g., station ID, TWT ID No. 6, and a value indicating the approval) in the memory of the AP 330, and it may transmit (e.g., broadcast) a response message including the TWT configuration information and the authority approval information.

According to an embodiment, if it is recognized that both ID Nos. 1 and 4 are in a saturated state, and adjustment of the service period of another TWT is not possible (e.g., if the data throughput at the corresponding TWT is equal to or higher than a predetermined level to cause a busy state as a whole), the AP 330 may transmit (e.g., broadcast) a response message including authority non-approval information (e.g., values indicating the station ID and a value indicating the non-approval). Accordingly, the station having requested the authority may access the wireless media at a usable TWT (e.g., TWT of ID No. 5 in Table 1) period regardless of the required service type.

According to an embodiment, the AP 330 may recover the authority for the TWT. For example, the AP 330 may configure an authority retention period for each station having an authority for the TWT. If the configured retention period expires, the AP 330 may delete authority approval information corresponding to the retention period expiration from the memory of the AP 330, and it may transmit (e.g., broadcast) a notification message including authority release information (e.g., a station ID, a TWT ID, and a value indicating authority release). As another example, the AP 330 may monitor the data throughput for each station retaining the authority. If the data throughput is lower than a designated critical value, the AP 330 may transmit (e.g., broadcast) the notification message including the authority release information.

According to an embodiment, the AP 330 may recognize an address of an external electronic device (e.g., server address) that communicates with the station by reading data received from the station (and/or external network 320), and it may determine whether to release the authority based on the recognized address. For example, if there is not data transmitted to the external electronic device (and/or received from the external electronic device) in a designated period, the AP 330 may release the authority of the station on the TWT allocated for communication between the external electronic device and the station (e.g., may delete the corresponding authority approval information from the memory of the AP 330), and it may transmit a notification message including the authority release information (e.g., a station ID, a TWT ID, and a value indicating the authority release).

According to certain embodiments, the AP 330 may share the authority information for the TWT with another AP, and thus the corresponding station may access the other AP with the same authority for the same TWT. For example, in an enterprise network, APs may share the TWT configuration information configured to access the wireless media at different TWTs for each service type and the TWT authority information.

According to certain embodiments, the AP 330 may recognize an address of an external electronic device (e.g., server address) that communicates with the station and/or a service type of data by reading the data received from the station (and/or external network 320), and it may transmit and receive the data of the corresponding service type with the stations 310_1, 310_2, 310_3, . . . , and/or 310_n at the TWT defined for each service type. The stations 310_1, 310_2, 310_3, . . . , and/or 310_n may share service type mapping information, such as a server address and a port number, with the AP 330 through definition and usage of a vendor specific action or an information element.

According to certain embodiments, the stations 310_1, 310_2, 310_3, . . . , and/or 310_n may store the TWT configuration information (e.g., TWT configuration information in Table 1) received from the AP 330 (e.g., may newly store or update the pre-stored TWT configuration information into the received TWT configuration information). The stations 310_1, 310_2, 310_3, . . . , and/or 310_n may identify the TWT allocated to the required service type based on the stored TWT configuration information, and they may attempt to access the wireless media for the service period of the identified TWT.

According to an embodiment, the stations 310_1, 310_2, 310_3, . . . , and/or 310_n may attempt to access the wireless media based on the authority approval information received from the AP 330. For example, the stations 310_1, 310_2, 310_3, . . . , and/or 310_n may operate in an active state in the service period of the TWT on which an authority is given to the stations in accordance with the authority approval information, and they may operate in an inactive state in the service period of the TWT on which the authority is not given.

According to an embodiment, the stations 310_1, 310_2, 310_3, . . . , and/or 310_n may perform back-off operation in an active state, and they may interrupt the back-off operation in an inactive state. For example, in the 802.11e standard, a back-off operation is defined to attempt traffic transmission after a random back-off time for each service type (e.g., VO, VI, BE, and/or BK). For example, the back-off time may be designed to be shorter as the priority becomes higher. Accordingly, there may be a high probability that a station that intends to transmit the traffic of the service type having a high priority pre-occupies the wireless media. The stations 310_1, 310_2, 310_3, . . . , and/or 310_n may perform the back-off operation in accordance with the standard in an active state. According to an embodiment, the stations 310_1, 310_2, 310_3, . . . , and/or 310_n may operate in an active state where they can access the wireless media or in an inactive state (or sleep state) where they interrupt an access to the wireless media. For example, the stations 310_1, 310_2, 310_3, . . . , and/or 310_n may operate in an active state where they intend to access the wireless media in the TWT service period allocated to the required service type. The stations 310_1, 310_2, 310_3, . . . , and/or 310_n may operate in an inactive state where they interrupt an access to the wireless media in a period except for the TWT service period allocated to the required service type. The active state of the stations 310_1, 310_2, 310_3, . . . , and/or 310_n may be a temporarily distributed deployment state, and thus the collision phenomenon, which is caused by the stations' attempts to simultaneously occupy the wireless media, can be prevented from occurring (or can be minimized).

According to certain embodiments, the stations 310_1, 310_2, 310_3, . . . , and/or 310_n may recognize that the service type corresponding to the user's requirements is not defined in the TWT configuration information received from the AP 330, and thus they may transmit a message for requesting the TWT generation (e.g., station ID (e.g., MAC address) and service type) to the AP 330. As a response message to this, the stations 310_1, 310_2, 310_3, . . . , and/or 310_n may receive the TWT configuration information, and they may update the existing TWT configuration information into the received TWT configuration information. According to an embodiment, the stations 310_1, 310_2, 310_3, . . . , and/or 310_n may receive the authority approval information (e.g., station ID, TWT ID, and a value indicating the approval) together with the TWT configuration information, and they may attempt to access the wireless media in a service period of the TWT on which the authority is given to themselves. According to an embodiment, the stations 310_1, 310_2, 310_3, . . . , and/or 310_n may receive information indicating that the TWT generation is not possible (e.g., station ID and a value indicating the TWT generation is not possible) as a response message, and they may access the wireless media in a usable TWT (e.g., TWT of ID No. 5 in Table 1) interval regardless of the required service type.

According to certain embodiments, in the case of requesting a new TWT generation or in the case where the AP 330 is unable to generate a new TWT, the stations 310_1, 310_2, 310_3, . . . , and/or 310_n may use a vendor specific action or an information element defined in the 802.11 standard in order to transfer such information, and they may use a frame and an information element defined in the 802.11ax standard in relation to authorization and release for a pre-generated TWT.

According to an embodiment, the stations 310_1, 310_2, 310_3, . . . , and/or 310_n may receive a notification message for notifying of an authority release from the AP 330, and thus the stations may operate in an inactive state during a service period of the released TWT.

According to an embodiment, if it is necessary to re-access the TWT on which the authority is released (e.g., if an application of the corresponding service type is executed), the stations 310_1, 310_2, 310_3, . . . , and/or 310_n may re-request the authority from the AP 330, and if an approval message is notified from the AP 330 in response to this, they may operate in an inactive state during the service period of the corresponding TWT.

According to certain embodiments, the stations 310_1, 310_2, 310_3, . . . , and/or 310_n may simultaneously obtain the authority on several TWTs corresponding to the respective service types, and they may perform a back-off operation to transmit data of the corresponding service type for respective service periods of the respective authorized TWTs.

According to certain embodiments, the stations 310_1, 310_2, 310_3, . . . , and/or 310_n may access the wireless media in the service period of the same TWT. For example, if a smart phone interacts (e.g., mirroring) with a TV connected to the AP 330 in the Internet of things (IoT), the smart phone and the TV can access the wireless media in the same time zone.

Figure 4:
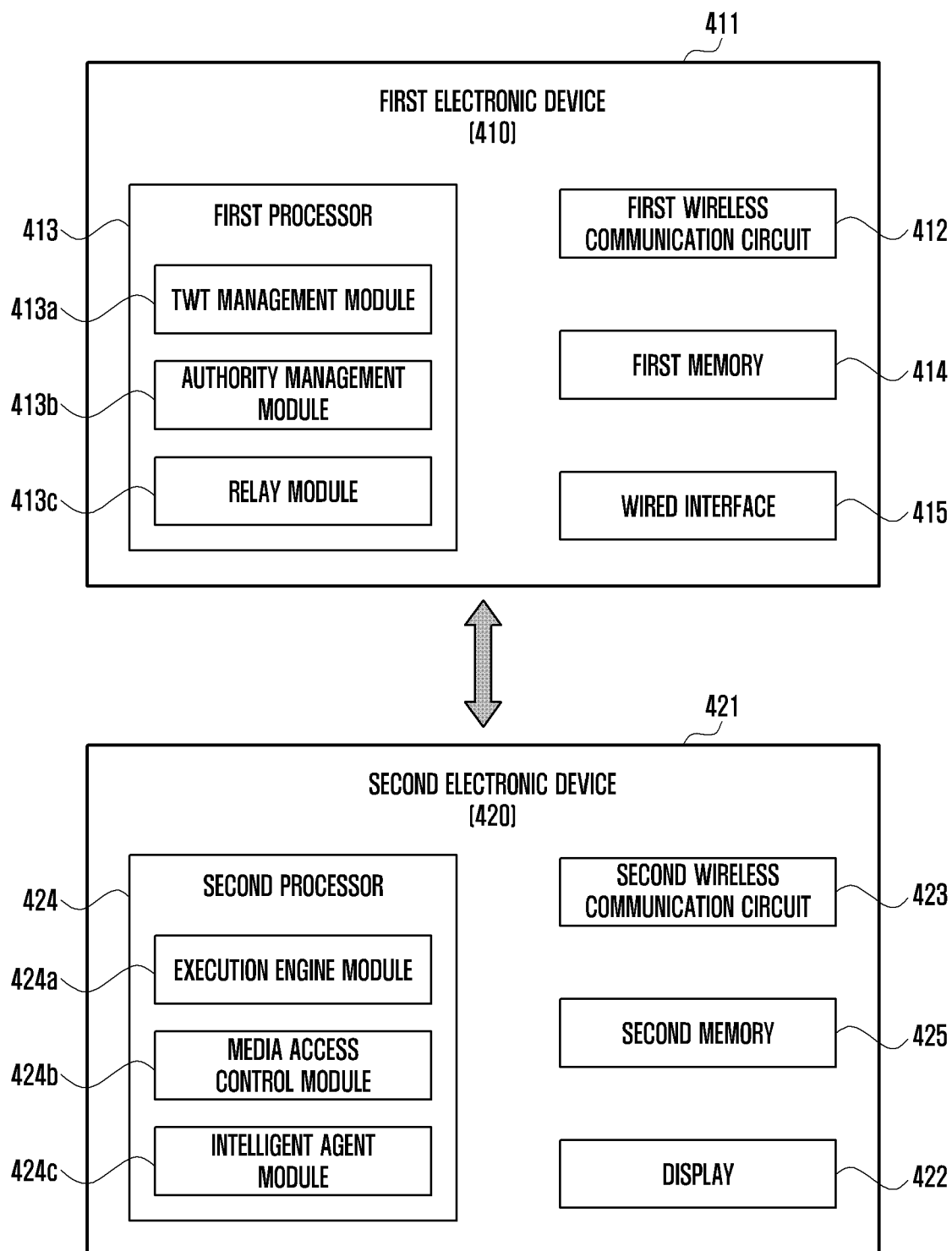
FIG. 4 is a block diagram of electronic devices configured to support an access to wireless media based on TWT configuration information according to certain embodiments of the disclosure.

FIG. 4 is a block diagram of electronic devices configured to support an access to wireless media (or wireless communication channel) based on TWT configuration information according to certain embodiments of the disclosure. With reference to FIG. 4, a first electronic device 410 (e.g., AP 330 of FIG. 3) according to an embodiment may include a first housing 411, at least one first wireless communication circuit 412 located inside the first housing 411 and configured to transmit and receive a wireless signal in accordance with the IEEE 802.11 standard, a first processor 413 operatively connected to the first wireless communication circuit 412, a first memory 414 operatively connected to the first processor 413 and configured to store information individually related to at least one service type (e.g., TWT configuration information and/or authority approval information as described above with reference to FIG. 3), and a wired interface 415 operatively connected to the first processor 413 and configured to transmit and receive data with an external network (e.g., external network 320 of FIG. 3). The first processor 413 may include a TWT management module 413a, an authority management module 413b, and a relay module 413c. In certain embodiments, the wireless communication circuit 412 can be configured to transmit and receive using another short-range wireless communication scheme.

A second electronic device 420 (e.g., one of stations 310_1, 310_2, 310_3, . . . , and/or 310_n of FIG. 3) according to an embodiment may include a second housing 421, a display 422 (e.g., display device 160 of FIG. 1) configured to be seen through a part of the second housing 421, at least one second wireless communication circuit 423 located inside the second housing 421 and configured to transmit and receive a wireless signal in accordance with the IEEE 802.11 standard, a second processor 424 operatively connected to the second wireless communication circuit 423, and a second memory 425 operatively connected to the second processor 424. The second processor 424 may include an execution engine module 424a, a media access control module 424b, and an intelligent agent module 424c. In certain embodiments, the wireless communication circuit 423 can be configured to transmit and receive using another short-range wireless communication scheme.

According to an embodiment, the first electronic device 410 and/or the second electronic device 420 may include all or parts of constituent elements of the electronic device 101 of FIG. 1. For example, the first memory 414 and/or the second memory 425 may correspond to the memory 130 of FIG. 1. The first wireless communication circuit 412 and/or the second wireless communication circuit 423 may correspond to the wireless communication module 192 of FIG. 1. The first processor 413 and/or the second processor 424 may correspond to the processor 120 of FIG. 1.

According to certain embodiments, at least one of the modules 413a, 413b, and 413c may be separate hardware that is different from the first processor 413, and it may be configured in the first electronic device 410. According to certain embodiments, at least one of the modules 424a, 424b, and 424c may be separate hardware that is different from the second processor 424, and it may be configured in the second electronic device 420.

According to certain embodiments, the modules 413a, 413b, and 413c may be software stored in the first memory 414, and thus the first processor 413 may execute the modules 413a, 413b, and 413c to perform their operations. According to certain embodiments, the modules 424a, 424b, and 424c may be software stored in the second memory 425, and thus the second processor 424 may execute the modules 424a, 424b, and 424c to perform their operations.

According to certain embodiments, the first processor 413 may control the second electronic device 420 to access the wireless media at a time allocated based on the service type required by the second electronic device 420. Accordingly, the second electronic device 420 may perform data communication (e.g., data reception and/or transmission) with an external network (e.g., external network 320 of FIG. 3) through the first electronic device. For example, the first processor 413 may transmit (e.g., broadcast) the TWT configuration information (e.g., TWT configuration information in Table 1) using the first wireless communication circuit 412. The first processor 413 may receive a participation request (or authority request) for a random TWT from the second electronic device 420 through the first wireless communication circuit 412. The first processor 413 may transmit a response message including authority approval information (e.g., an ID of the second electronic device 420, a TWT ID, and a value indicating authority approval) to the second electronic device 420 through the first wireless communication circuit 412. The first processor 413 may control the first wireless communication circuit 412 to transmit and receive data with the second electronic device 420 during a service period of the TWT on which the second electronic device 420 has the authority.

According to certain embodiments, the TWT management module 413a may support at least one service type (e.g., VO, VI, BE, and/or BK), and it may manage the TWT individually related to the supportable service type. For example, the TWT management module 413a may perform substantially the same operations as the operations of the AP 330 of FIG. 3 for generation and deletion of the TWT.

According to certain embodiments, the authority management module 413b may manage an authority for a wireless media access by the second electronic device 420. For example, the authority management module 413b may perform substantially the same operations as the operations of the AP 330 of FIG. 3 for authority giving and recovery.

According to certain embodiments, the relay module 413c may perform a bridge function for connecting between the second electronic device 420 and the external network (e.g., external network 320 of FIG. 3) for a period allocated to be accessible to the wireless media. For example, the relay module 413c may receive first data (e.g., packet) corresponding to the service type of the first TWT from the second electronic device 420 through the first wireless communication circuit 412 during the service period of the first TWT, and it may transmit the received first data to the external network through the wired interface 415. The relay module 413c may receive second data from the external network through the wired interface 415, and it may transmit the second data to the second electronic device 420 through the first wireless communication circuit 412 during the service period of the second TWT corresponding to the service type of the second data.

According to certain embodiments, the second processor 424 may receive information about the time for which data of the service type required by a user can be transmitted and received from the first electronic device 410 through the second wireless communication circuit 423, and it may perform data communication (e.g., data reception and/or transmission) with the external network (e.g., external network 320 of FIG. 3) through the first electronic device 410 through an access to the wireless media for the above-described time. For example, the second processor 424 may receive the TWT configuration information (e.g., TWT configuration information in Table 1) from the first electronic device 410 through the second wireless communication circuit 423. The second processor 424 may identify the TWT of the service type in accordance with an application execution (or data communication performing) from the TWT configuration information, and it may transmit an authority request for the service period of the identified TWT to the first electronic device 410 through the second wireless communication circuit 423. The second processor 424 may receive a response message including the authority approval information (e.g., an ID of the second electronic device 420, a TWT ID, and a value indicating the authority approval) from the first electronic device 410 through the second wireless communication circuit 423. The second processor 424 may control the second wireless communication circuit 423 to transmit and receive data with the first electronic device 410 during the service period of the TWT on which the second electronic device 420 has the authority.

According to certain embodiment, the execution engine module 424a may execute an application (e.g., application 146 of FIG. 2) stored in the second memory 425 in accordance with a user's input received through an input device (not illustrated) (e.g., a microphone or a digital pen of the input device 150 of FIG. 1).

According to certain embodiments, the media access control module 424b may identify the service type that an application executed by the execution engine module 424a intends to provide to the user. According to an embodiment, the media access control module 424b may recognize that the service type is any one of VO, VI, BE, and BK by reading data as defined in the 802.11e standard (e.g., an access category (AC) of a packet) that is transferred from a higher layer (e.g., application being executed) to a lower layer (e.g., second wireless communication circuit 423).

According to certain embodiments, the media access control module 424b may identify the TWT corresponding to the identified service type from the TWT configuration information stored in the second memory 425, and it may control the second wireless communication circuit 423 to transmit and/or receive the data of the service type during the service period of the identified TWT.

According to certain embodiments, the intelligent agent module 424c may generate text data by recognizing a user's voice input (e.g., user's utterance), grasp user's intention by analyzing the text data, select at least one application to process the user's intention (command), and generate an action planning to be performed by the at least one selected application. For example, the action planning may include information about an application (e.g., media player 273 of FIG. 2), an action (or operation) to be performed by the application (e.g., video reproduction or VoIP), and parameters required to perform the above-described operations (e.g., an address of a web site to provide video or a phone number of a call opposite party). If several operations are to be performed, the action planning may include applications to perform the respective operations and information indicating the order of the operations. The intelligent agent module 424c may transfer the action planning to the execution engine module 424a to process the user's intention. The execution engine module 424a may identify the service type (e.g., video (VI) or voice (VO) from the action planning, and it may transmit the identified service type to the media access control module 424b.

According to an embodiment, the intelligent agent module 424c may recognize the user's utterance and it may generate corresponding text data using a deep-learned acoustic model and/or a language model. For example, the acoustic model and the language model may be stored in the second memory 425. According to a certain embodiment, the intelligent agent module 424c may identify the service type of the user's utterance (voice data), and it may transmit the identified service type to the media access control module 424b. The media access control module 424b may transmit the user's utterance to an external electronic device through the second wireless communication circuit 423 and the first electronic device 410 during the service period of the TWT corresponding to the identified service type, and it may receive the result (e.g., text data or action planning) in accordance with the process of the external electronic device from the external electronic device through the second wireless communication circuit 423 and the first electronic device 410 to transfer the received result to the intelligent agent module 424c.

According to an embodiment, the intelligent agent module 424c may grasp the user's intention by processing the text data using a deep-learned natural language understanding (NLU) model. For example, the intelligent agent module 424c may understand the user's intention by performing syntactic analysis and/or semantic analysis of the NLU model with respect to the text data. According to a certain embodiment, the intelligent agent module 424c may identify the service type of the text data, and it may transmit the identified service type to the media access control module 424b. The media access control module 424b may transmit the text data to the external electronic device through the second wireless communication circuit 423 and the first electronic device 410 during the service period of the TWT corresponding to the identified service type, and it may receive the result (e.g., action planning) in accordance with the processing of the external electronic device from the external electronic device (e.g., server) through the second wireless communication circuit 423 and the first electronic device 410 to transfer the received result to the intelligent agent module 424c.

According to certain embodiments, the second processor 424 may identify how the time for which the wireless media can be accessed is distributed for each service type from the TWT configuration information received from the first electronic device 410, and may ask a user for preferences of service types (e.g., display a user interface (UI) on the display 422 so as to enable the user to identify the service types and to input the preferences of the respective service types).

Figure 5:
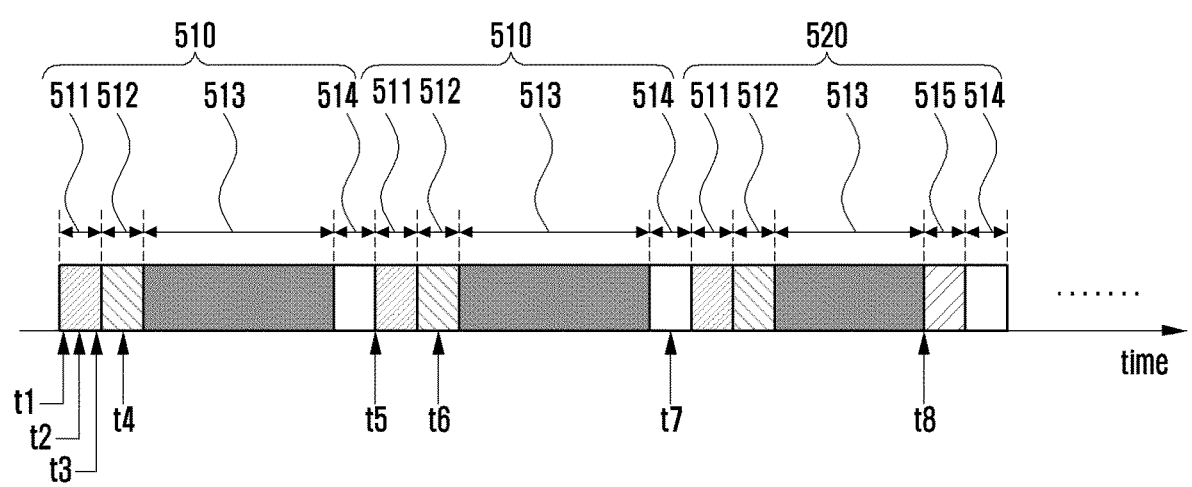
FIG. 5 is a diagram explaining operations of accessing wireless media at times divided by service types according to certain embodiments of the disclosure.

FIG. 5 is a diagram of a frame divided by service types according to certain embodiments of the disclosure. With reference to FIG. 5, the time for which the wireless media can be accessed may be distributed by service types. For example, a first frame 510, in which a first TWT 511 of a video (VI) type, a second TWT 512 of a VI type, a third TWT 513 of a best effect (BE) type, and a fourth TWT 514 of a background (BK) type are configured in order without overlapping each other, may be repeated in a first period. The first TWT configuration information indicating the first time table 510 may be generated by the AP (e.g., AP 330 of FIG. 3), and it may be shared (through broadcasting) by stations (e.g., stations 310_1, 310_2, 310_3, . . . , and/or 310_n of FIG. 3).

According to certain embodiments, the first station, e.g., 310-1, (e.g., one of the stations 310_1, 310_2, 310_3, . . . , and/or 310_n of FIG. 3) may execute an application for the VI service at time t1.

The second station 310-2 may execute an application for the VI service at time t2.

The third station, e.g., 310-3 may execute an application for the BK service at time t3.

The first station may transmit an authority request for the VI service to the AP (e.g., AP 330 of FIG. 3), and it may receive authority approval information corresponding to the authority request. The first station may recognize that time t1 corresponds to a VI service period and is the first TWT 511 on which the first station itself does not have an access authority through the first TWT configuration information and the authority approval information of the first station itself. The first station may recognize that the second TWT 512 corresponds to the same VI service period and is the TWT on which the first station itself has an access authority through the first time table 510 and the authority approval information. Accordingly, the first station may perform an access operation (e.g., back-off operation) to the wireless media at a start time of the second TWT 512. The first station may interrupt the access to the wireless media at an expiration time of the second TWT 512, and it may attempt to access the wireless media again at the start time of the next second TWT 512.

The second station may transmit an authority request for the VI service to the AP, and it may receive authority approval information corresponding to the authority request. The second station may recognize that time t2 corresponds to a VI service period and has an authority on the first TWT 511 through the first TWT configuration information and the authority approval information of the second station itself. Accordingly, the second station may perform an access operation to the wireless media until the service period of the first TWT 511 expires. The second station may interrupt the access to the wireless media at an expiration time of the first TWT 511, and it may attempt to access the wireless media again at the start time of the next first TWT 511.

The third station may transmit an authority request for the BK service to the AP, and it may receive authority approval information corresponding to the authority request. The third station may recognize that time t3 does not correspond to a BK service period and thereafter, the third TWT 513 corresponds to the BK service time. Accordingly, the third station may perform an access operation (e.g., back-off operation) to the wireless media at a start time of the third TWT 513. If no authority is given on the third TWT 513, the third station may receive the authority on the third TWT 513 from the AP (e.g., AP 330 of FIG. 3), and then it may attempt to access the wireless media during the service period of the third TWT 513.

According to certain embodiments, the fourth station (e.g., one of the stations 310_1, 310_2, 310_3, . . . , and/or 310_n of FIG. 3) may execute an application for the VI service at time t4. The fourth station may recognize that time t4 corresponds to a VI service period through the first TWT configuration information. Accordingly, the fourth station may request the AP (e.g., AP 330 of FIG. 3) to give an authority on the second TWT 512. The AP may recognize that the second TWT 512 is in a saturated state (e.g., in a state where the number of members (stations) participating in the second TWT 512 exceeds a predetermined number) and the first TWT 511 for the same VI service is not yet in the saturated state. Accordingly, the AP may provide the authority on the first TWT 511 to the fourth station. The fourth station may attempt to access the wireless media at time t5 when the first TWT 511 starts. According to a certain embodiment, the fourth station may request the AP to give the authority on the VI service type. The AP may provide, to the fourth station, the authority of a surplus TWT (e.g., the first TWT 511 is not yet in the saturated state) of the first TWT 511 and the second TWT 512 of the corresponding service type. Accordingly, the fourth station may attempt to access the wireless media at time t5 when the first TWT 511 starts.

According to certain embodiments, the fifth station, e.g., 310-5, may execute an application for the VI service at time t6. The fifth station may recognize that time t6 corresponds to a VI service period through the first TWT configuration information. Accordingly, the fifth station may request the AP (e.g., AP 330 of FIG. 3) to give an authority on the second TWT 512. The AP may recognize that the second TWT 512 is currently (e.g., at time t4) in a saturated state and the first TWT 511 for the same VI service is also in the saturated state. Accordingly, the AP may notify the fifth station that the wireless media access for the corresponding service is not possible. Accordingly, the fifth station may re-request to give the authority after a predetermined time. As another example, in the case where a default TWT (not illustrated) (e.g., refer to Table 1) is configured in the first time table 510, the fifth station may attempt to access the wireless media during the service period of the default TWT.

According to certain embodiments, the sixth station, e.g., 310-6 may execute an application for the voice (VO) (e.g., VoIP) service at time t7. The sixth station may recognize that the TWT for the VO service is not configured in the first time table 510 through identification of the first TWT configuration information. Accordingly, the sixth station may request the AP (e.g., AP 330 of FIG. 3) to configure a new time table for the VO service. The AP may configure a new second time table 520. For example, the AP 330 may reduce the service period of the third TWT 513, and it may use the reduced time from TWT 513 for the VO service time for the fifth TWT 515. The AP may share (e.g., through broadcasting) the second TWT configuration information indicating the second time table 520 with the stations. The AP may provide the authority on the fifth TWT 515 to the sixth station. The sixth station may attempt to access the wireless media at time t8 when the service period of the fifth TWT 515 starts.

Figure 6:
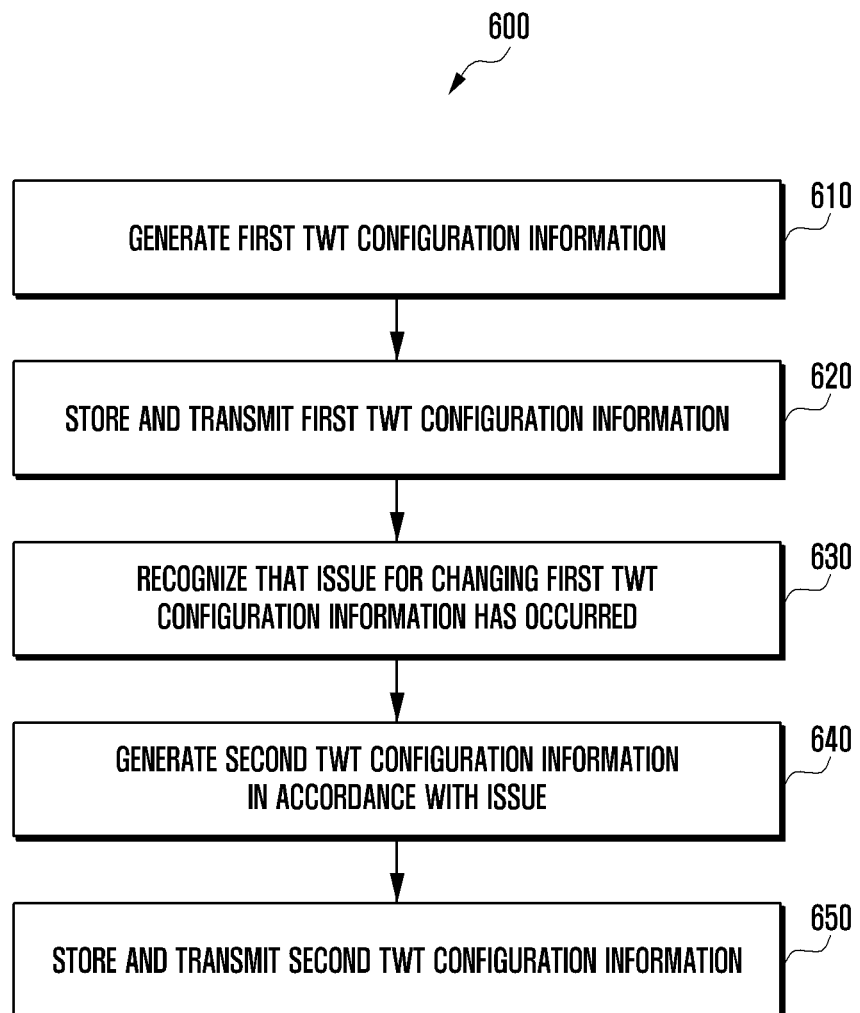
FIG. 6 is a diagram illustrating operations of managing a TWT of an electronic device according to certain embodiments of the disclosure.

FIG. 6 is a diagram illustrating operations (600) of managing a TWT of an electronic device (e.g., first electronic device 410 of FIG. 4) according to certain embodiments of the disclosure. The operations of FIG. 6 may be performed by a processor (e.g., first processor 413 of FIG. 4).

According to certain embodiments, at operation 610, a processor may generate first TWT configuration information having a first time table (e.g., first time table 510 of FIG. 5), for example, periodically or based on stations' requests.

According to certain embodiments, at operation 620, the processor may store the first TWT configuration information in a memory (e.g., first memory 414 of FIG. 4), and it may transmit (e.g., broadcast) the first TWT configuration information through a communication circuit (first wireless communication circuit 412 of FIG. 4). For example, the processor may transfer the first TWT configuration information at determined intervals of a beacon using a vendor-specific information element in the beacon.

According to certain embodiments, at operation 630, the processor may recognize that an issue for changing the first TWT configuration information has occurred. According to an embodiment, the processor may configure a timer for each TWT. The processor may recognize that the TWT that is not used until the timer expires (e.g., corresponding to data throughput that is equal to or lower than a first critical value) exists in the first time table as one of the issues (hereinafter, first issue). According to an embodiment, the processor may receive a request for generation of a new TWT (e.g., TWT of a service type that is not configured in the first time table) from an external electronic device (e.g., second electronic device 420 of FIG. 4), and it may recognize the request as one of the issues (hereinafter, second issue).

According to certain embodiments, at operation 640, the processor may generate second TWT configuration information corresponding to a second time table by configuring the second time table in accordance with the issue. According to an embodiment, the processor may delete the TWT corresponding to the first issue from the first time table, and it may lengthen the service period of another TWT as long as the service period of the deleted TWT to configure the second time table. According to an embodiment, the processor may add the TWT corresponding to the second issue to the first time table, and it may reduce the service period of the existing other TWT as long as the service period of the added TWT to configure the second time table (e.g., second time table 520 of FIG. 5).

According to certain embodiments, at operation 650, the processor may store the second TWT configuration information corresponding to the newly configured second time table in a memory (e.g., first memory 414 of FIG. 4), and it may transmit (e.g., broadcast) the second TWT configuration information.

Figure 7:
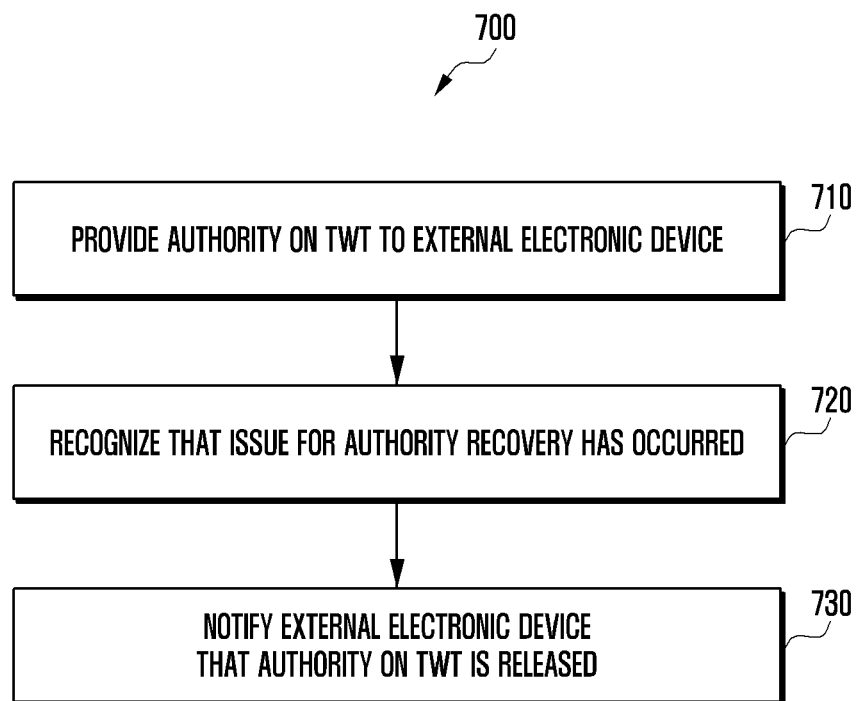
FIG. 7 is a diagram illustrating operations of recovering a TWT authority of an electronic device according to certain embodiments of the disclosure.

FIG. 7 is a diagram illustrating operations (700) of recovering (or releasing) a TWT authority of an electronic device (e.g., first electronic device 410 of FIG. 4) according to certain embodiments of the disclosure. The operations of FIG. 7 may be performed by a processor (e.g., first processor 413 of FIG. 4).

According to certain embodiments, at operation 710, the processor may provide a TWT authority to an external electronic device in response to reception of a request (e.g., a message including an ID of an external electronic device, a TWT ID, and a value indicating an authority request) of the external electronic device (e.g., second electronic device 420 of FIG. 4).

According to certain embodiments, at operation 720, the processor may recognize that an issue for recovering the provided authority has occurred. For example, the processor may configure an authority retention period for the TWT. The processor may recognize that the configured retention period has expired as the issue.

According to certain embodiments, at operation 730, the processor may notify the external electronic device of the release of the TWT authority if the issue has occurred. For example, the processor may transmit (e.g., broadcast) authority release information (e.g., an ID of an external electronic device, a TWT ID, and a value indicating the authority release). The processor may update the TWT configuration information based on the authority recovery, and it may transmit (e.g., broadcast) the updated TWT configuration information through a communication circuit (e.g., first wireless communication circuit 412 of FIG. 4).

Figure 8:
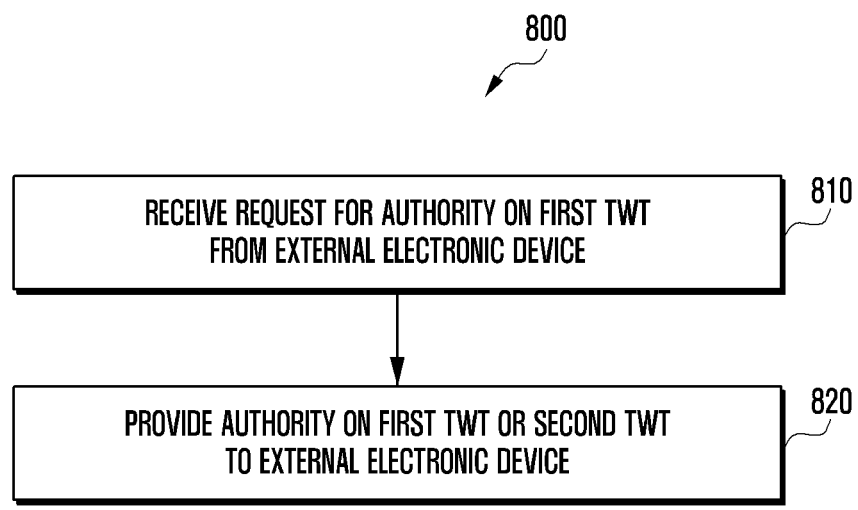
FIG. 8 is a diagram illustrating operations of providing a TWT authority of an electronic device according to certain embodiments of the disclosure.

FIG. 8 is a diagram illustrating operations (800) of providing a TWT authority of an electronic device (e.g., first electronic device 410 of FIG. 4) according to certain embodiments of the disclosure. The operations of FIG. 8 may be performed by a processor (e.g., first processor 413 of FIG. 4).

According to certain embodiments, at operation 810, the processor may receive a message for requesting an authority of the first TWT (e.g., including an ID of an external electronic device, a first TWT ID, and/or a service type) from the external electronic device (second electronic device 420 of FIG. 4).

According to certain embodiments, at operation 820, the processor may provide, to the external electronic device, an authority on the first TWT or the second TWT having the same allocated service type as the service type allocated to the first TWT in accordance with the request. According to an embodiment, if the first TWT is not in a saturated state (e.g., if the first TWT is not in a state where the number of members (stations) having the authority on the first TWT exceeds a predetermined number), the processor may transmit authority approval information for the first TWT (e.g., the first TWT ID, an ID of the external electronic device, and a value indicating the authority approval). According to an embodiment, if the first TWT is in a saturated state and the second TWT is not in a saturated state, the processor may transmit the authority approval information for the second TWT (e.g., the second TWT ID, an ID of the external electronic device, and a value indicating the authority approval).

Figure 9:
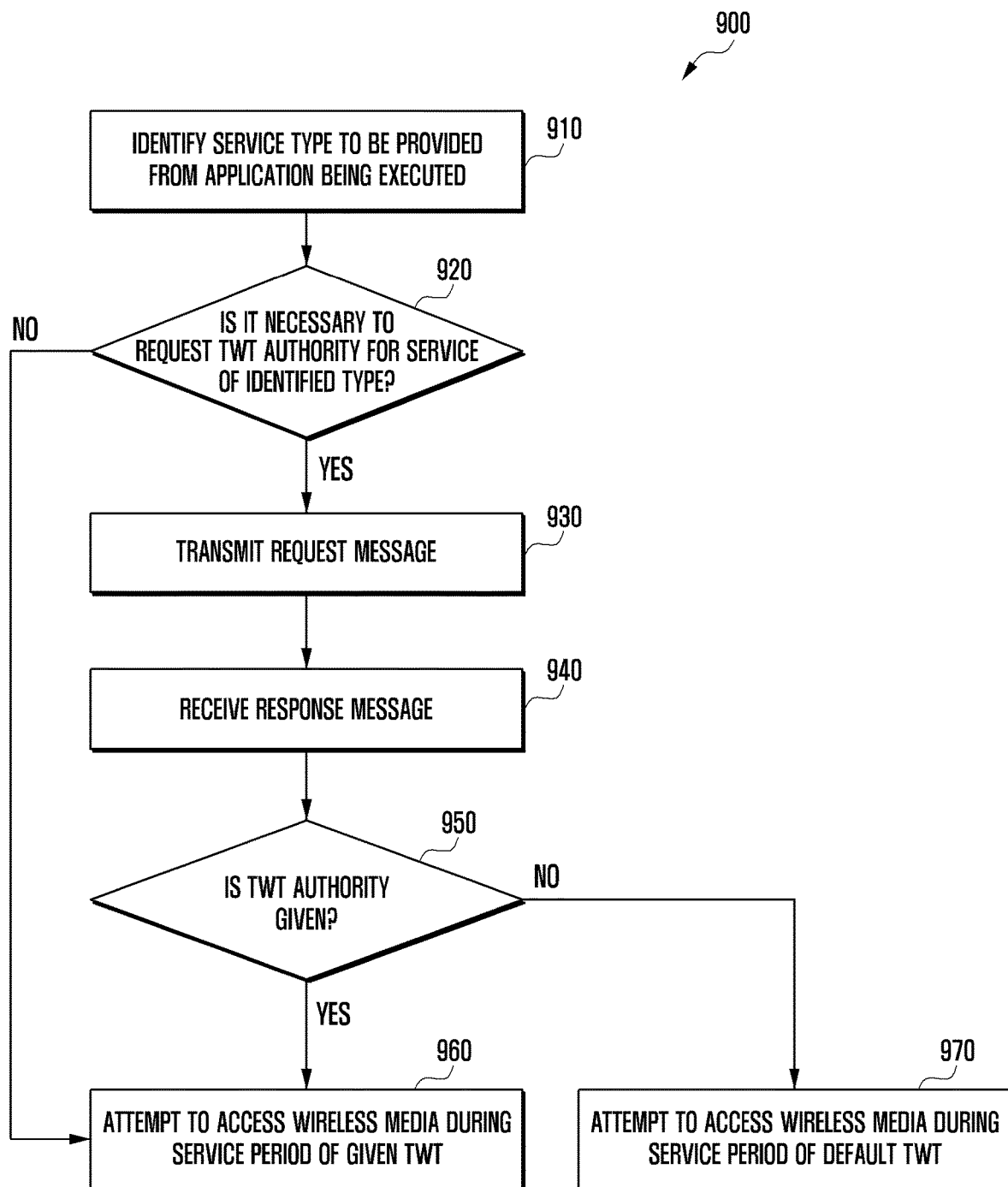
FIG. 9 is a diagram illustrating operations of accessing wireless media based on a TWT in an electronic device according to certain embodiments of the disclosure.

FIG. 9 is a diagram illustrating operations (900) of accessing wireless media based on a TWT in an electronic device (e.g., second electronic device 420 of FIG. 4) according to certain embodiments of the disclosure. The operations of FIG. 9 may be performed by a processor (e.g., second processor 424 of FIG. 4).

According to certain embodiments, at operation 910, the processor may identify a type of a service that an application being executed intends to provide to a user.

According to certain embodiments, at operation 920, the processor may determine whether it is necessary to request an external electronic device (e.g., first electronic device 410 of FIG. 4) to provide an authority on a TWT for the identified service type. For example, with reference to TWT configuration information and authority approval information stored in a memory (e.g., second memory 425 of FIG. 4), the processor may determine whether the TWT corresponding to the identified service type is configured in a time table configured by the external electronic device and whether the electronic device has the authority on the TWT if the TWT is configured in the time table.

According to certain embodiments, at operation 930, if it is determined that it is necessary to request the external electronic device to provide the authority on the TWT (e.g., if the TWT is not configured in the time table or if the electronic device does not retain the authority), the processor may transmit a request message to the external electronic device.

According to certain embodiments, at operation 940, the processor may receive a response message as a feedback of the external electronic device with respect to the request message.

According to certain embodiments, at operation 950, the processor may determine whether the TWT authority is given to the electronic device from the response message.

According to certain embodiments, at operation 960, if an ID of an electronic device, a TWT ID, and a value indicating an approval are included in the response message as the authority approval information, the processor may attempt to access the wireless media during a service period of the TWT having the above-described ID.

According to certain embodiments, at operation 970, if authority non-approval information is included in the response message, the processor may attempt to access the wireless media during a service period of a default TWT.

According to certain embodiments, if it is determined that it is not necessary to request the external electronic device to provide the authority on the TWT as the result of the determination at operation 920 (e.g., if the electronic device retains the authority of the TWT ID based on the service type to be provided by an application being executed), the processor may perform operation 960.

Figure 10:
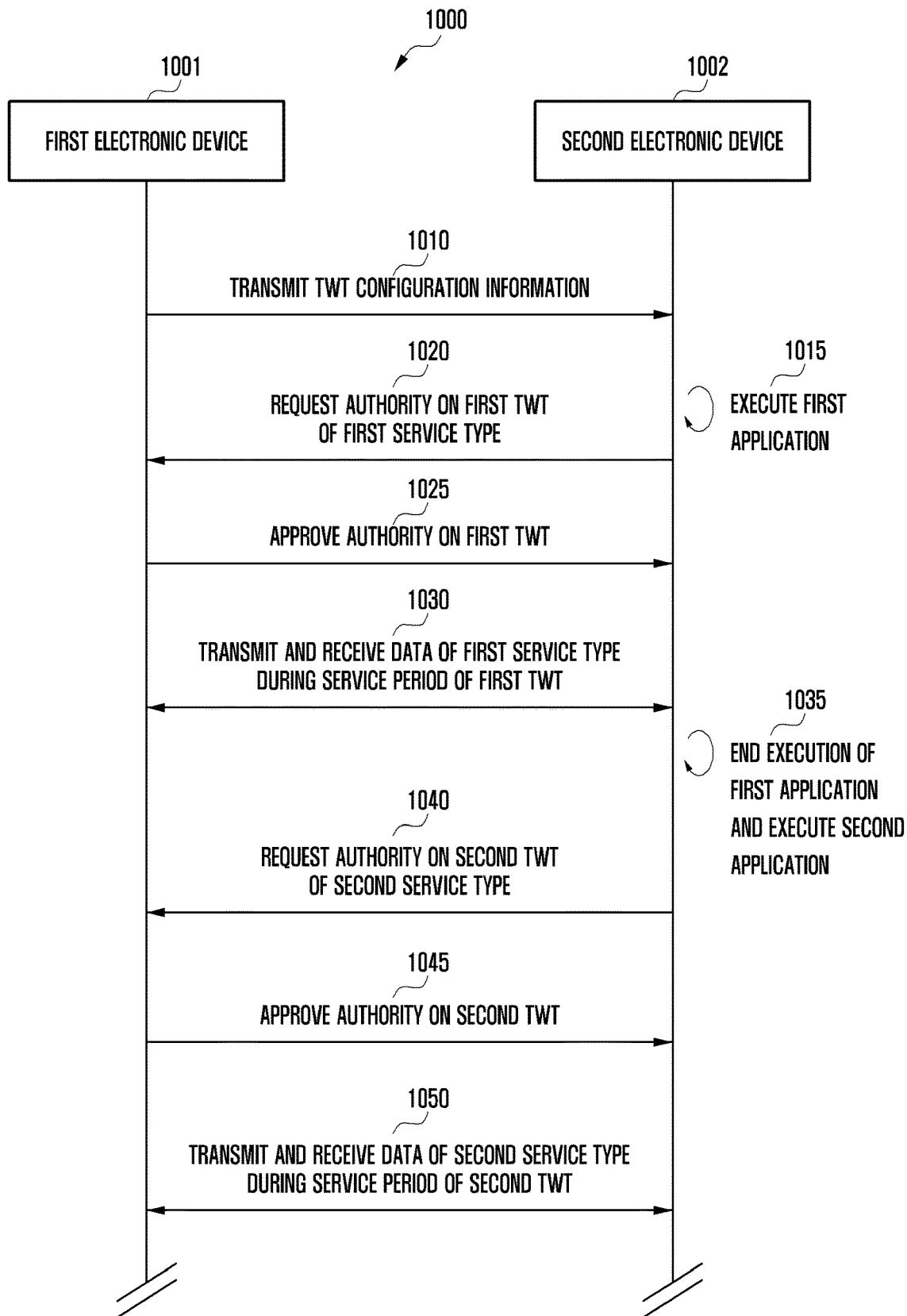
FIG. 10 is a diagram illustrating operations of electronic devices configured to support an access to wireless media based on TWT configuration information according to certain embodiments of the disclosure.

FIG. 10 is a diagram illustrating operations (1000) of electronic devices configured to support an access to wireless media based on TWT configuration information according to certain embodiments of the disclosure. In FIG. 10, a first electronic device 1001 and a second electronic device 1002 may be the access point 320 and a station 310 of FIG. 3, respectively.

According to certain embodiments, at operation 1010, the first electronic device 1001 may configure a time table (e.g., first time table 520 of FIG. 5), and it may transmit configured TWT configuration information to the second electronic device 1002. The second electronic device 1002 may store therein the received TWT configuration information.

According to certain embodiments, at operation 1015, the second electronic device 1002 may execute a first application (e.g., VoIP application) and transmit (operation 1020) a first request message for authority on the first TWT of the first service type (e.g., VI) of the first application.

According to certain embodiments, at operation 1025, the first electronic device 1001 may transmit, to the second electronic device 1002, a first response message approving the authority on the first TWT to the second electronic device.

According to certain embodiments, at operation 1030, the first electronic device 1001 and the second electronic device 1002 may transmit and receive data of a first service type during a service period of the first TWT.

According to certain embodiments, at operation 1035, the second electronic device 1002 may end execution of the first application, and it may execute the second application (e.g., web browser).

According to certain embodiments, at operation 1040, the second electronic device 1002 may transmit, to the first electronic device 1001, a second request message of contents to give an authority on the second TWT of the second service type (e.g., BE) of the second application to the second electronic device.

According to certain embodiments, at operation 1045, the first electronic device 1001 may transmit, to the second electronic device 1002, a second response message of contents to approve the authority on the second TWT to the second electronic device.

According to certain embodiments, at operation 1050, the first electronic device 1001 and the second electronic device 1002 may transmit and receive data of a second service type during a service period of the second TWT.

The second electronic device 1002 according to an embodiment may simultaneously perform the first application and the second application, and it may receive the authority on the first TWT and the second TWT from the first electronic device 1001 to transmit and receive data of the corresponding type with the first electronic device during the respective service periods.

The first electronic device (e.g., first electronic device 410 of FIG. 4) according to certain embodiments may include a housing (e.g., housing 411 of FIG. 4); at least one wireless communication circuit (e.g., first wireless communication circuit 412) located inside the housing and configured to transmit and receive a wireless signal in accordance with the IEEE 802.11 standard; a processor (e.g., first processor 413 of FIG. 4) operatively connected to the wireless communication circuit; and a memory (e.g., first memory 414 of FIG. 4) operatively connected to the processor and configured to store target wake time (TWT) configuration information based on a quality of service (QoS) individually related to at least one service type, wherein the memory, when executed, stores instructions to cause the processor to: broadcast a signal including the TWT configuration information using the wireless communication circuit, receive, from an external electronic device (e.g., second electronic device 420 of FIG. 4), an authority request for a first TWT at least partly based on the broadcasted information, transmit an authority approval for the first TWT to the external electronic device based on the TWT configuration information and the authority request, and transmit and receive data with the external electronic device at a time selected by the TWT configuration information based on the first TWT.

According to certain embodiments, the TWT configuration information may be generated based on a latency and/or a service period for the service type.

According to certain embodiments, the TWT configuration information may include the at least one service type supported by the electronic device and/or an ID of the first TWT.

According to certain embodiments, the instructions may cause the processor to generate the first TWT if the first TWT is not included in the TWT configuration information. The instructions may cause the processor to update the TWT configuration information by reducing a period allocated to another second TWT as long as a time allocated to the first TWT, and broadcast the updated TWT configuration information using the wireless communication circuit.

According to certain embodiments, the at least one service type supported by the first electronic device may include a voice (VO), a video (VI), a best effect (BE), and a background (BK) in accordance with the 802.11e standard. The TWT configuration information may include information indicating an ID of the first TWT, a service period of the first TWT, a service type allocated to the first TWT, and an interval of the first TWT.

According to certain embodiments, the instructions may cause the processor to adjust the service period of the first TWT based on a data throughput for the service period of the first TWT, and broadcast a signal including information indicating the adjusted service period of the first TWT using the wireless communication circuit. The instructions may cause the processor to update the TWT configuration information by deleting the first TWT from the TWT configuration information if the data throughput is equal to or lower than a designated critical value, and broadcast the updated TWT configuration information using the wireless communication circuit. The instructions may cause the processor to update the TWT configuration information by lengthening a service period allocated to another second TWT as long as the deleted service period of the first TWT, and broadcast the updated TWT configuration information using the wireless communication circuit.

According to certain embodiments, the instructions may cause the processor to configure the interval of the first TWT based on a latency defined by a period between a moment when a packet is sent from the external electronic device and a moment when the packet arrives at another external electronic device that is a destination of the packet. The instructions may cause the processor to configure the interval of the first TWT shorter than a designated critical latency.

According to certain embodiments, the instructions may cause the processor to transmit, to the external electronic device, a notification message including contents indicating that an authority of the external electronic device on the first TWT is released if a designated retention period is exceeded after the approval.

According to certain embodiments, the instructions may cause the processor to transmit, to the external electronic device, a participation approval for another second TWT having the same service type as that of the first TWT and having a different service period from that of the first TWT if the number of external electronic devices authorized on the first TWT on which the external electronic device requests to have an authority corresponds to a designated value.

According to certain embodiments, the instructions may cause the processor to update the TWT configuration information by shortening a period allocated to another second TWT as long as a period allocated to the first TWT, and broadcast the updated TWT configuration information using the wireless communication circuit.

The second electronic device (e.g., second electronic device 420 of FIG. 4) according to certain embodiments may include a housing (housing 421 of FIG. 4); a display (e.g., display 422 of FIG. 4) configured to be shown through a part of the housing; at least one wireless communication circuit (e.g., second wireless communication circuit 423 of FIG. 4) located inside the housing and configured to transmit and receive a wireless signal in accordance with the IEEE 802.11 standard; a processor operatively connected to the display and the wireless communication circuit; and a memory (e.g., second memory 425 of FIG. 4) operatively connected to the processor, wherein the memory, when executed, stores instructions to cause the processor to: receive a signal including target wake time (TWT) configuration information from an external electronic device (e.g., first electronic device 410 of FIG. 4) through the wireless communication circuit, transmit an authority request for a first TWT based on a first service type supported by the electronic device, receive an authority approval for the first TWT from the external electronic device, and transmit and receive data with the external electronic device at a time selected by the TWT configuration information based on the first TWT.

According to certain embodiments, the TWT configuration information may be generated based on a latency and/or a service period for the service type.

According to certain embodiments, the TWT configuration information may include the at least one service type supported by the electronic device and/or an ID of the first TWT.

According to certain embodiments, the instructions may cause the processor to transmit, to the external electronic device, a message of contents to request generation of the first TWT if the first TWT is not included in the TWT configuration information.

According to certain embodiments, the at least one service type supported by the external electronic device may include a voice (VO), a video (VI), a best effect (BE), and a background (BK) in accordance with the 802.11e standard, and the TWT configuration information may include information indicating an ID of the first TWT, a service period of the first TWT, a service type allocated to the first TWT, and an interval of a first TWT membership.

According to certain embodiments, the instructions may cause the processor to identify a type of a service to be provided by an application being executed, identify a TWT for the identified type of the service based on the TWT configuration information received from the external electronic device, and transmit an authority request of the identified TWT to the external electronic device through the wireless communication circuit.

A method for operating an electronic device (e.g., first electronic device 410 of FIG. 4) according to certain embodiments may include broadcasting target wake time (TWT) configuration information based on a quality of service (QoS) individually related to at least one service type using at least one wireless communication circuit configured to transmit and receive a wireless signal in accordance with the IEEE 802.11 standard; receiving, from an external electronic device (e.g., second electronic device 420 of FIG. 4), an authority request for a first TWT at least partly based on the broadcasted information; transmitting an authority approval for the first TWT to the external electronic device based on the TWT configuration information and the authority request; and transmitting and receiving data with the external electronic device at a time selected by the TWT configuration information based on the first TWT.

It will be understood that the embodiments of the disclosure as disclosed in the description and drawings are specific examples to help easy understanding of the technical contents according to the embodiments of the disclosure and do not limit the scope of the embodiments of the disclosure. Accordingly, the scope of the disclosure is defined by the appended claims, and it will be construed that all corrections and modifications derived from the meanings and scope of the following claims and the equivalent concept fall within the scope of the disclosure.

What is claimed is:

1. An access point (AP) device for facilitating wireless communication, the AP device comprising:
   one or more memories; and
   one or more processors coupled to the one or more memories, the one or more processors configured to cause:
     generating a target wake time (TWT) element including information indicating a type of traffic and a priority of the traffic, the information being determined based on acceptable latency for the traffic;
     transmitting, to a non-AP device, the TWT element through a wireless medium; and
     receiving, from the non-AP device, the type of traffic indicated by the information at a time indicated by the TWT element through the wireless medium.

2. The AP device of claim 1, wherein only the type of traffic indicated by the information is allowed for communication with the non-AP device at the time indicated by the TWT element through the wireless medium.

3. The AP device of claim 1, wherein the information indicating the type of traffic is associated with an access category.

4. The AP device of claim 1, wherein the type of traffic is a voice (VO), a video (VI), a best effort (BE), or a background (BK).

5. The AP device of claim 1, wherein the information indicates one or more types of traffic.

6. The AP device of claim 1, wherein the TWT element further includes a TWT identifier and a TWT service period.

7. The AP device of claim 6, wherein the one or more processors are further configured to cause:
   broadcasting a notice indicating that no access to the wireless medium is allowed by any non-AP devices other than the non-AP device during a period of time.

8. The AP device of claim 7, wherein the period of time overlaps with the TWT service period.

9. A non-access point (non-AP) device for facilitating wireless communication, the non-AP device comprising:
   one or more memories; and
   one or more processors coupled to the one or more memories, the one or more processors configured to cause:
     receiving, from an AP device through a wireless medium, a target wake time (TWT) element including information indicating a type of traffic and a priority of the traffic, the information being determined based on acceptable latency of the traffic;
     in response to receiving the TWT element, transmitting the type of traffic indicated by the information at a time indicated by the TWT element through the wireless medium.

10. The non-AP device of claim 9, wherein only the type of traffic indicated by the information is allowed for communication with the AP device at the time indicated by the TWT element through the wireless medium.

11. The non-AP device of claim 9, wherein the information indicating the type of traffic is associated with an access category.

12. The non-AP device of claim 9, wherein the type of traffic is a voice (VO), a video (VI), a best effort (BE), or a background (BK).

13. The non-AP device of claim 9, wherein the information indicates one or more types of traffic.

14. The non-AP device of claim 9, wherein the TWT element further includes a TWT identifier and a TWT service period.

15. The non-AP device of claim 14, wherein the one or more processors are further configured to cause:
   receiving, from the AP device, a notice indicating that no access to the wireless medium is allowed by any non-AP devices other than the non-AP device during a period of time.

16. The non-AP device of claim 15, wherein the period of time overlaps with the TWT service period.

* * * * *